United States Patent
Takano et al.

(10) Patent No.: US 10,761,273 B2
(45) Date of Patent: Sep. 1, 2020

(54) SNAP IN FIBER OPTIC FERRULE ADAPTER

(71) Applicant: SENKO Advanced Components, Inc., Marlborough, MA (US)

(72) Inventors: Kazuyoshi Takano, Southborough, MA (US); Kenji Iizumi, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 15/796,969

(22) Filed: Oct. 30, 2017

(65) Prior Publication Data
US 2018/0356600 A1 Dec. 13, 2018

Related U.S. Application Data

(60) Provisional application No. 62/519,162, filed on Jun. 13, 2017.

(51) Int. Cl.
*G02B 6/38* (2006.01)
*G02B 6/42* (2006.01)

(52) U.S. Cl.
CPC ......... *G02B 6/3825* (2013.01); *G02B 6/3882* (2013.01); *G02B 6/3897* (2013.01); *G02B 6/3869* (2013.01); *G02B 6/3885* (2013.01); *G02B 6/3893* (2013.01); *G02B 6/3898* (2013.01); *G02B 6/4292* (2013.01)

(58) Field of Classification Search
CPC .. G02B 6/3825; G02B 6/3885; G02B 6/3882; G02B 6/3898; G02B 6/3897; G02B 6/3869
See application file for complete search history.

(56) References Cited

U.S. PATENT DOCUMENTS

| | | | |
|---|---|---|---|
| 5,940,561 A * | 8/1999 | Dean, Jr. | G02B 6/3825 |
| | | | 385/59 |
| 6,095,695 A | 8/2000 | Ohtsuka et al. | |
| 6,146,192 A * | 11/2000 | Cabalka | H01R 13/73 |
| | | | 439/540.1 |
| 6,632,023 B1 | 10/2003 | Ogawa et al. | |

(Continued)

FOREIGN PATENT DOCUMENTS

| JP | 11023908 A | 1/1999 |
|---|---|---|
| JP | 2000-338367 A | 12/2000 |

*Primary Examiner* — Ryan A Lepisto
*Assistant Examiner* — Erin D Chiem
(74) *Attorney, Agent, or Firm* — Edward S. Jarmoloqicz, Esq.

(57) ABSTRACT

A fiber optic ferrule adapter for mating a multi-fiber optic ferrule and a multi-fiber optic connector includes a holder having a cavity where a multi-fiber optic ferrule is held therein, and a receptacle housing with an opening that allows the insertion of a fiber optic connector. The holder has a top opening for receiving the ferrule into its cavity; and two protrusions, which are respectively protruded from each interior side walls of the holder, for latching the ferrule in place inside the cavity. The holder includes a groove recessed on the interior walls of the cavity for catching a ridge on the ferrule so as to prevent any longitudinal movement of the ferrule inside the cavity. The cavity may include a slope next to an interface between the cavity and receptacle housing for allowing the sliding in-and-out of the ferrule at an angle to the top of the holder opening.

14 Claims, 10 Drawing Sheets

(56) References Cited

U.S. PATENT DOCUMENTS

| | | | |
|---|---|---|---|
| 7,029,322 B2* | 4/2006 | Ernst | G02B 6/3897 |
| | | | 385/56 |
| 7,296,935 B1 | 11/2007 | Childers et al. | |
| 8,157,454 B2 | 4/2012 | Ito et al. | |
| 2005/0220422 A1 | 10/2005 | Brief et al. | |
| 2013/0188912 A1* | 7/2013 | Bimboese | G02B 6/389 |
| | | | 385/60 |
| 2014/0270646 A1* | 9/2014 | Haley | G02B 6/3893 |
| | | | 385/70 |
| 2015/0093078 A1* | 4/2015 | Yu | G02B 6/4284 |
| | | | 385/77 |

* cited by examiner

SNAP IN FIBER OPTIC FERRULE ADAPTER

CROSS-REFERENCES TO RELATED APPLICATIONS

This application claims priority to U.S. Patent Application No. 62/519,162 filed Jun. 13, 2017; the disclosure of which is incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to fiber optic connectors and adapters, and more particularly, to fiber optic adapters for mating multi-fiber optic ferrules and fiber optic connectors.

BACKGROUND OF THE INVENTION

Modern high capacity optical systems often utilize fiber optic ribbons for inter-system connection. As there are multiple connection points in an optical path, there are needs for mating two fiber optic ferrules or a ferrule to another connector. In the mating of two fiber optic ferrules or a ferrule and a connector, the mechanical and optical alignment is paramount. Slight misalignment can result in significant signal loss, especially in the case of ferrules and connectors for multi-fiber optic ribbons and cables. Therefore, there is a need for an adapter that can hold and secure two fiber optic ferrules or a ferrule and a connector in alignment with precision. The adapter design should also allow that installation of the ferrules and connectors that is easy enough for in-field assembly. Further, the adapter should be durable in design and/or material for repeated installations and uninstallations.

SUMMARY OF THE INVENTION

According to the present invention, a fiber optic ferrule adapter for mating a multi-fiber optic ferrule and a multi-fiber optic connector is provided. The fiber optic ferrule adapter includes a holder having a cavity where a multi-fiber optic ferrule is held therein, and a receptacle housing with an opening that allows the insertion of a fiber optic connector. The holder has a top facing opening for receiving the multi-fiber optic ferrule into its cavity; and at least two protrusions, which are respectively protruded from each interior side walls of the holder, for latching the multi-fiber optic ferrule in place so as to secure the multi-fiber optic ferrule inside the cavity of the holder. The holder further includes a groove recessed at the interior walls of the holder for catching a ridge on the multi-fiber optic ferrule so as to prevent any longitudinal movement of the multi-fiber optic ferrule inside the cavity. The holder may further include a slope next to an interface between the cavity and receptacle housing for allowing the sliding of the multi-fiber optic ferrule at an angle from the top of the fiber optic ferrule adapter so as to ease the insertion into or extraction from the cavity of the multi-fiber optic ferrule.

BRIEF DESCRIPTION OF THE DRAWINGS

Embodiments of the invention are described in more detail hereinafter with reference to the drawings, in which.

DETAILED DESCRIPTION

In the following description, apparatuses for mating two multi-fiber optic ferrules and a multi-fiber optic ferrule with a multi-fiber optic connector and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
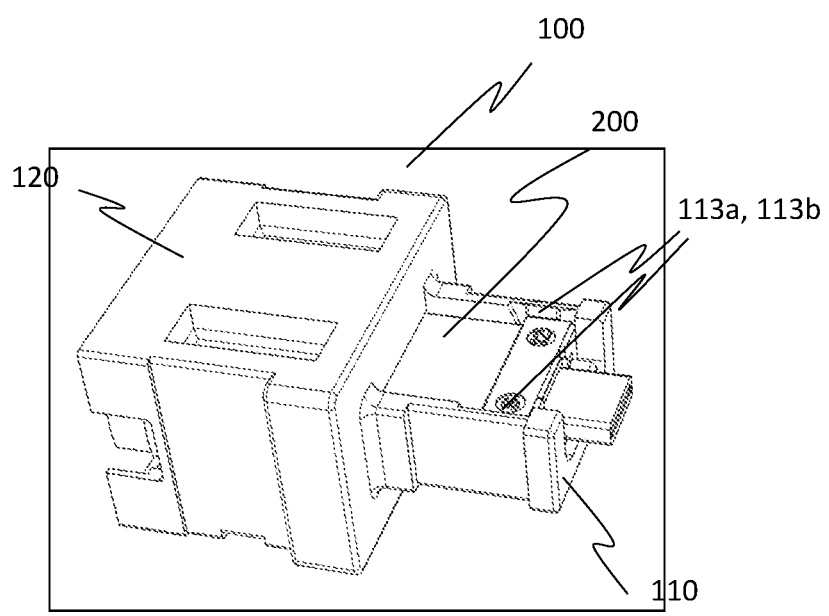
FIG. 1 depicts a fiber optic ferrule adapter with a multi-fiber optic ferrule inserted therein in accordance to an embodiment of the present invention.

FIG. 1 depicts an embodiment of a fiber optic ferrule adapter 100 with a multi-fiber optic ferrule 200 being inserted therein. The adapter 100 includes a holder 110 having a cavity for holding and securing the multi-fiber optic ferrule 200 therein and a receptacle housing 120 with an opening at the one end further away from the holder 110 that allows the insertion of a fiber optic connector. The holder 110 has a top facing opening for receiving the multi-fiber optic ferrule 200 into its cavity, and two protrusions 113a and 113b, which are respectively protruded from each interior side walls of the holder 110, for latching the multi-fiber optic ferrule 200 in place.

Figure 2A:
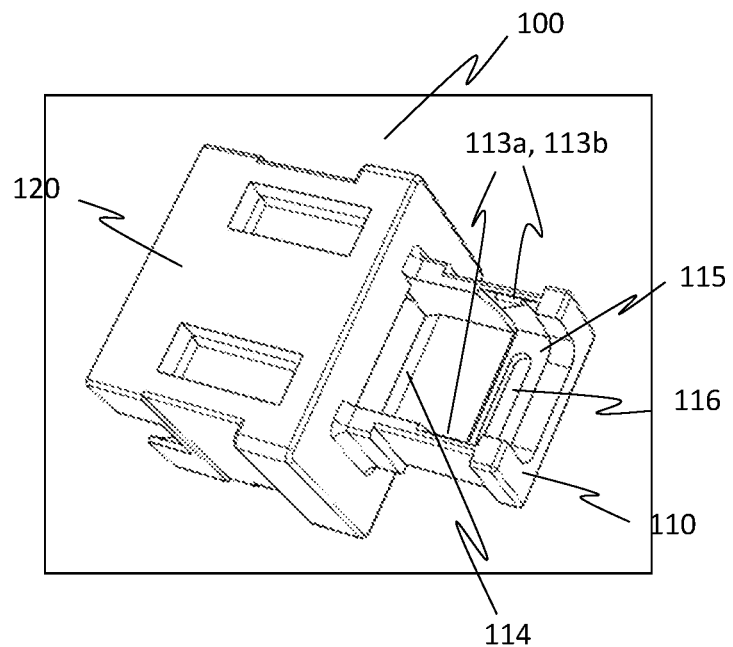
FIG. 2a depicts the fiber optic ferrule adapter without the multi-fiber optic ferrule.
Figure 2B:
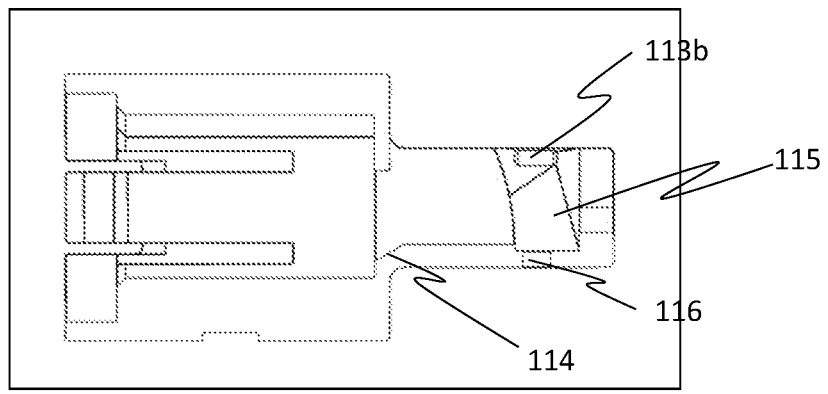
FIG. 2b depicts its cross-sectional view from a plane cutting through a central line along the optical axis.

FIG. 2a depicts a perspective view of the fiber optic ferrule adapter 100 without any multi-fiber optic ferrule being inserted. FIG. 2b depicts its cross-sectional view from a plane cutting through a central line along the longitudinal axis of the fiber optic ferrule adapter 100. It can be seen that the holder 110 further comprises a groove 115 recessed on three sides of the interior wall of the holder and a slope 114 next to the interface between the cavity of the holder 110 and the receptacle housing 120. In another embodiment, the groove 115 may be recessed on one side, which can be the bottom, or the two opposing sides of the interior wall of the holder.

Figure 3:
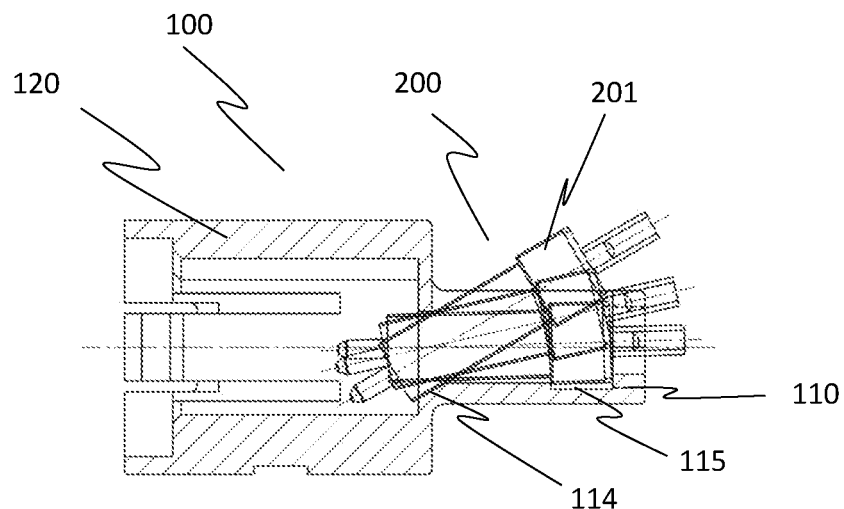
FIG. 3 shows a cross-sectional view from a plane cutting through a central line along the optical axis of the fiber optic ferrule adapter with a multi-fiber optic ferrule being inserted into (or extracted from) the cavity 301 during installation (or uninstallation)

FIG. 3 shows a cross-sectional view from a plane cutting through a central line along the longitudinal axis of the fiber optic ferrule adapter 100 with a multi-fiber optic ferrule 200 being inserted into (or extracted from) the cavity of the holder 110 during installation (or uninstallation). It can be seen that during the insertion or extraction, the slope 114 allows the sliding of the multi-fiber optic ferrule 200 at an angle to the top of the fiber optic ferrule adapter 100 so as to ease the insertion or extraction of the multi-fiber optic ferrule. Once the multi-fiber optic ferrule is completely inserted and held inside the cavity of the holder 110, the groove 115 catches a ridge 201 on the multi-fiber optic ferrule and secures the multi-fiber optic ferrule in place so as to prevent any longitudinal movement of the multi-fiber optic ferrule along the longitudinal axis of the fiber optic ferrule adapter 100 inside the cavity of the holder 110.

Figure 4:
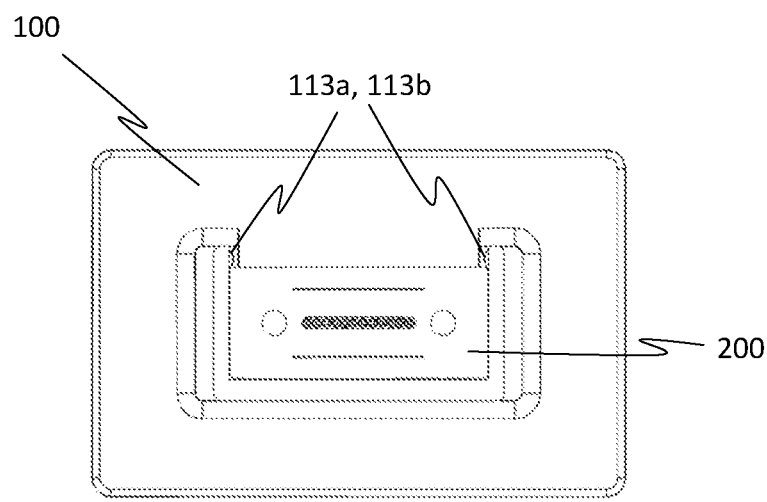
FIG. 4 shows a cross-sectional view from a plane cutting through two protrusions of the fiber optic ferrule adapter with the multi-fiber optic ferrule inserted therein.

FIG. 4 shows a cross-sectional view from a plane cutting through two protrusions 113a and 113b of the fiber optic ferrule adapter 100 with the multi-fiber optic ferrule 200 inserted therein. It can be seen that the two protrusions 113a and 113b latch the multi-fiber optic ferrule in place so as to prevent any up-down movement of the multi-fiber optic ferrule inside the cavity of the holder 110.

In one embodiment of the fiber optic ferrule adapter as shown in FIG. 1, the protrusions 113a and 113b are in dome shape. In another embodiment, the protrusions 113a and 113b are in wedge shape.

Figure 5A:
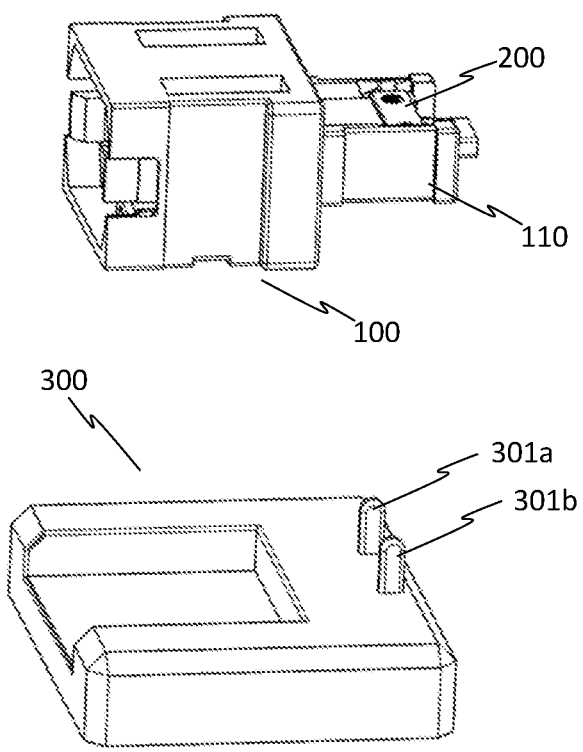
FIG. 5a shows a perspective view of a ferrule removal tool in accordance to one embodiment of the present invention along with the fiber optic ferrule adapter.
Figure 5B:
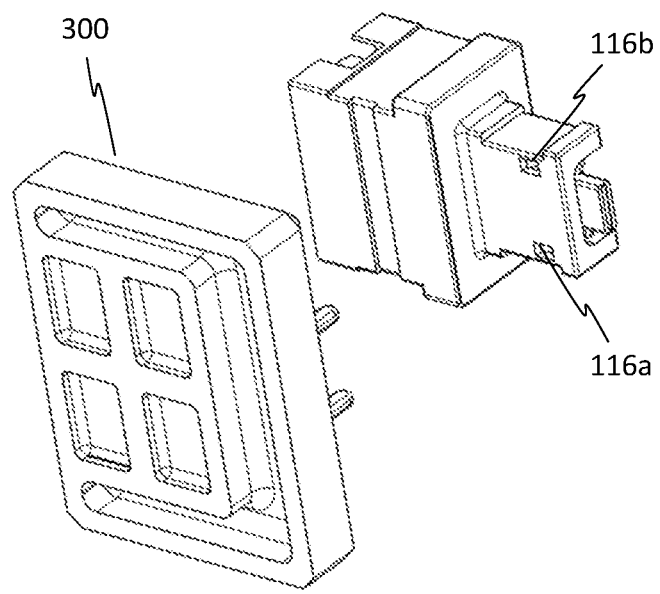
FIG. 5b shows another perspective view of the ferrule removal tool along with the fiber optic ferrule adapter.

In accordance to another aspect, the present invention provides a ferrule removal tool 300 comprising two protrusions 301a and 301b as shown in FIG. 5a. It can be seen from FIG. 5b that the protrusions 301a and 301b can be inserted into a through-holes 116a and 116b respectively located at the bottom the holder 110 of the fiber optic ferrule adapter 100. The protrusions 301a and 301b are configured with a length long enough to reach inside the cavity of the holder 110 when inserted fully into the through-holes 116a and 116b such that one can exert an upward pushing force on the multi-fiber optic ferrule 200 held within the cavity of the holder 110. With an appropriate amount of upward pushing force, the multi-fiber optic ferrule 200 is forced out and released from the holder 110.

Figure 6A:
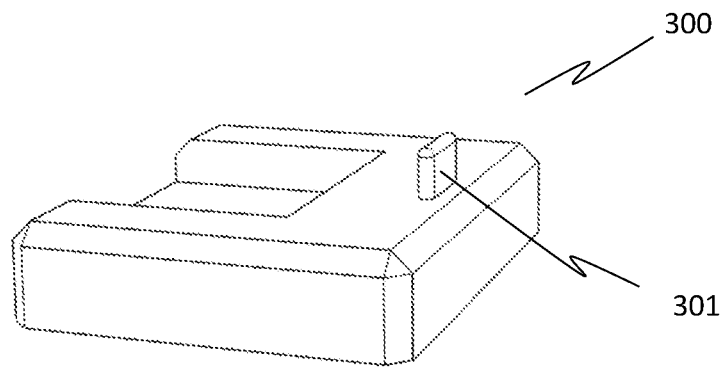
FIG. 6a shows a perspective view of a ferrule removal tool in accordance to another embodiment of the present invention.
Figure 6B:
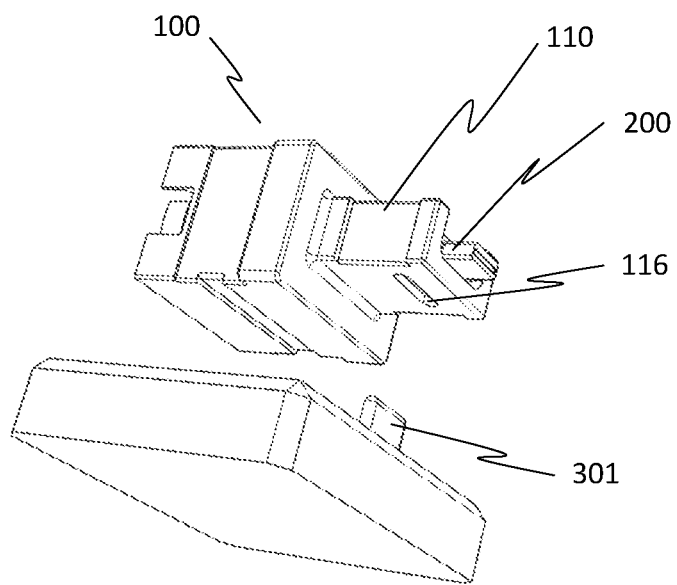
FIG. 6b shows another perspective view of the ferrule removal tool along with the fiber optic ferrule adapter.

In another embodiment, the ferrule removal tool 300 comprises one protrusion 301 as shown in FIG. 6a. In this case, the holder 110 has one corresponding through-hole 116 as shown in FIG. 6b. Similarly, other embodiments of ferrule removal tools with three, four, five, etc. protrusions with corresponding number of through-hole in the holders are possible.

Figure 7A:
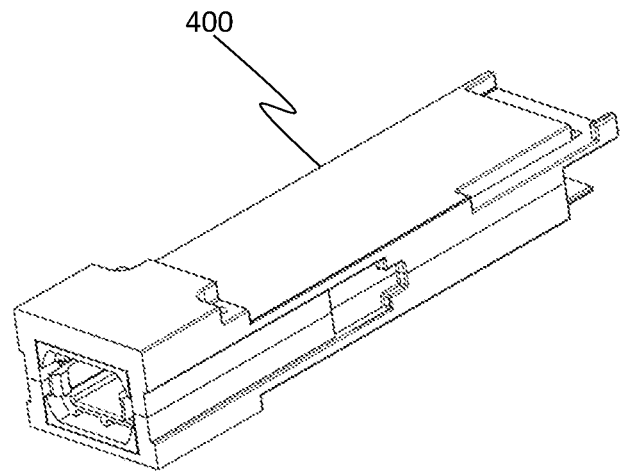
FIG. 7a depicts the fiber optic ferrule adapter encased in an optional outer housing in accordance to one embodiment of the present invention.
Figure 7B:
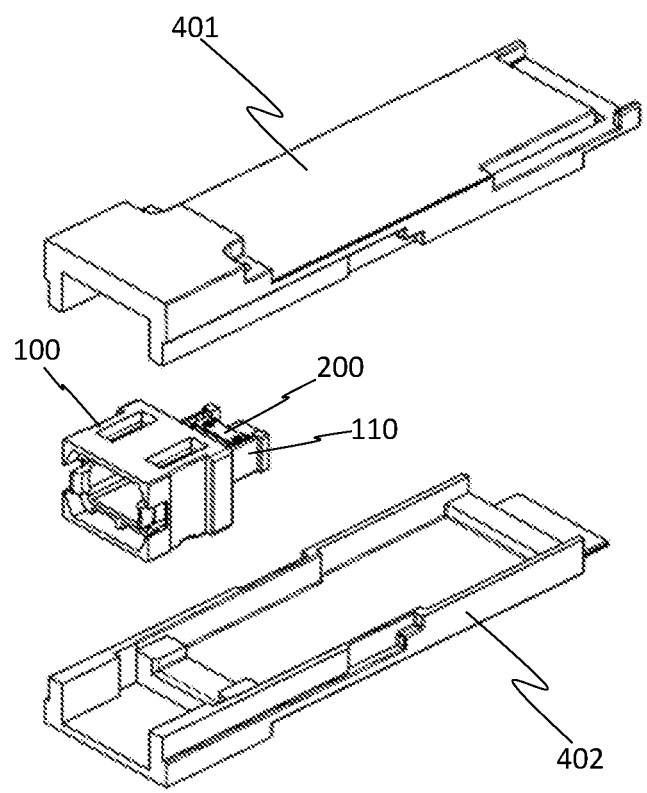
FIG. 7b depicts the fiber optic ferrule adapter and the optional outer housing before assembly.

Referring to FIG. 7a. In accordance to another aspect of the present invention, the fiber optic ferrule adapter 100 may be encased inside an optional outer housing 400 when a multi-fiber optic ferrule 200 is held within the cavity 110. It can be seen from FIG. 7b that one embodiment of the outer housing 400 is formed by a top shell 401 and a bottom shell 402 for sandwiching and holding the fiber optic ferrule adapter 100 and the multi-fiber optic ferrule 200 there in between.

Figure 8A:
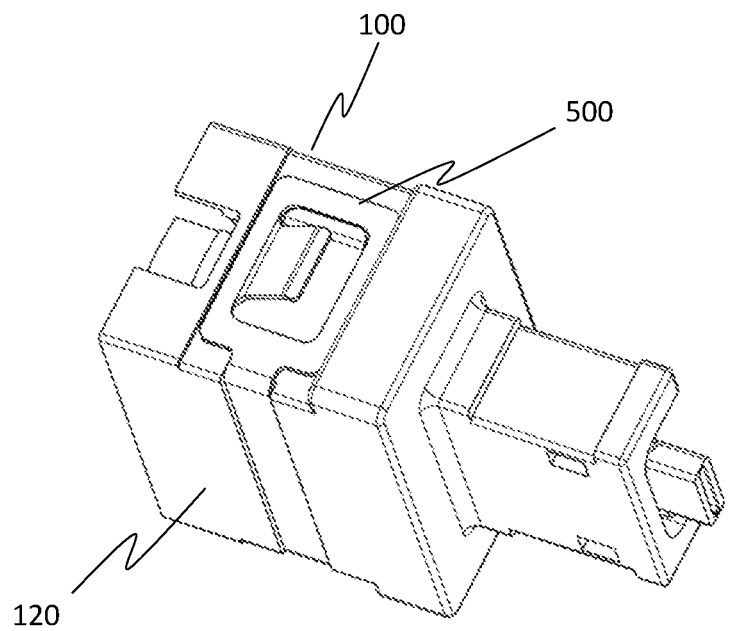
FIG. 8a shows a perspective view of the fiber optic ferrule adapter installed with an optional mounting plate.
Figure 8B:
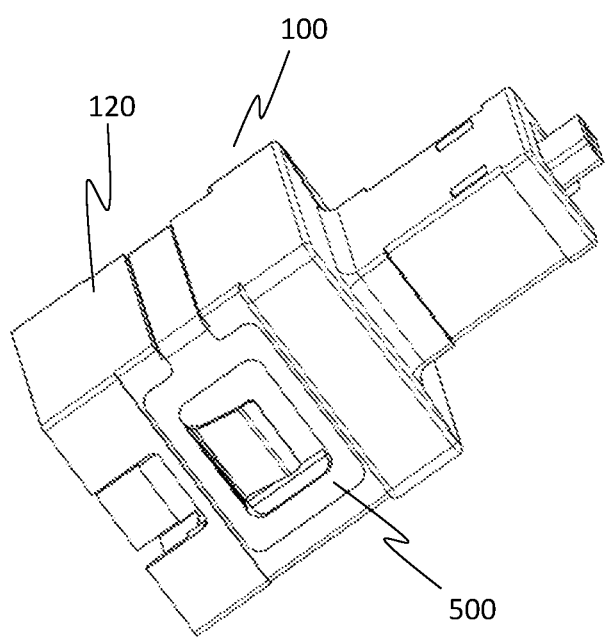
FIG. 8b shows another perspective view of the fiber optic ferrule adapter installed with the optional mounting plate.
Figure 9A:
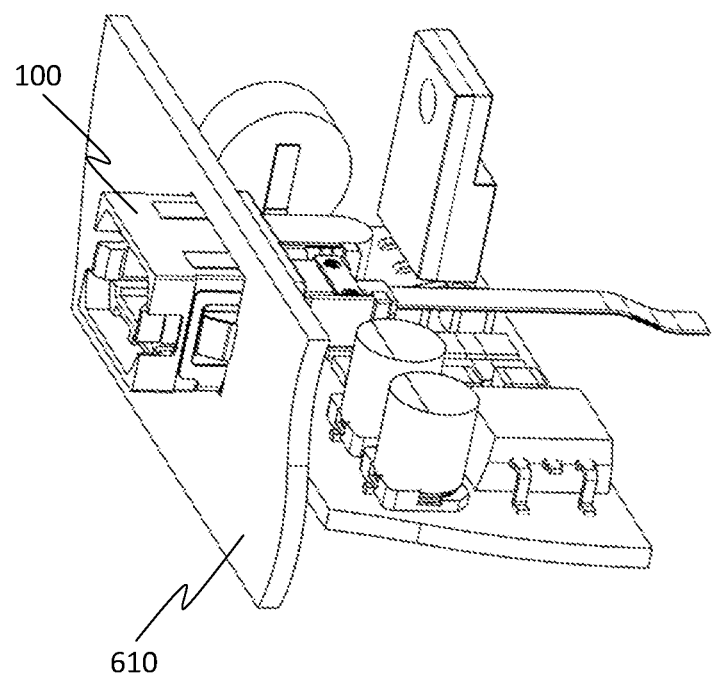
FIG. 9a depicts the fiber optic ferrule adapter installed with the optional mount plate inserted and secured in a connector panel.
Figure 9B:
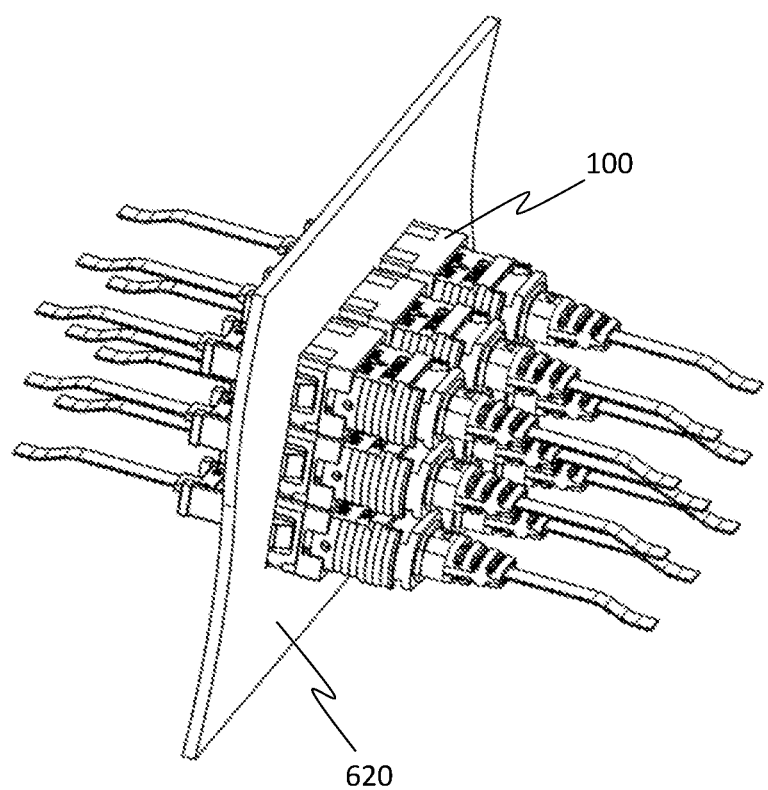
FIG. 9b depicts a plurality of fiber optic ferrule adapters installed with the optional mount plates inserted and secured in a multi-connector panel.

Referring to FIGS. 8a and 8b. In accordance to another aspect of the present invention, the fiber optic ferrule adapter 100 may be installed with an optional mount plate 500. The mount plate 500 is installed on the receptacle housing 120 of the fiber optic ferrule adapter 100. The mount plate 500 is further secured in a groove around the three sides of the receptacle housing 120 of the fiber optic ferrule adapter 100 main body, so to prevent any lateral movement of the mount plate 500 in respect with the fiber optic ferrule adapter 100. FIG. 9a depicts the fiber optic ferrule adapter 100 installed with the mount plate 500 inserted and secured in a connector panel 610; and FIG. 9b depicts a plurality of fiber optic ferrule adapters 100 installed with the mount plates 500 inserted and secured in a multi-connector panel 620.

Figure 10A:
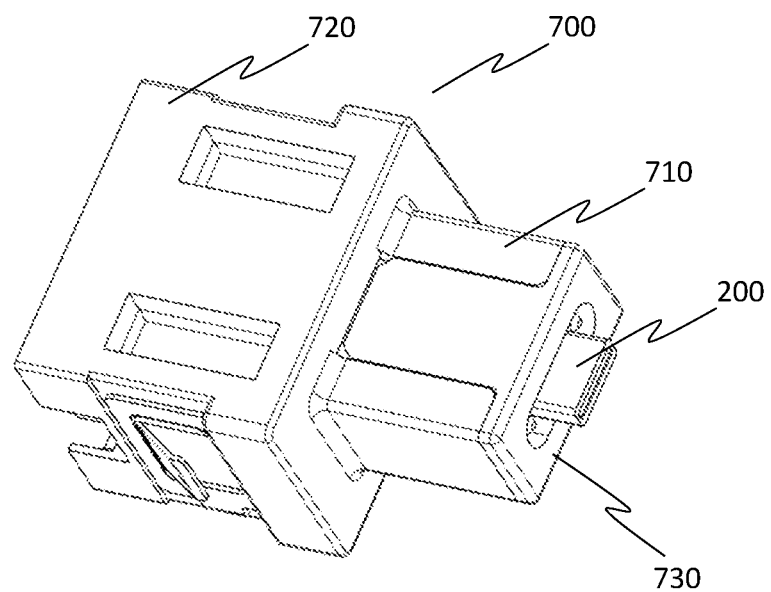
FIG. 10a depicts a fiber optic ferrule adapter with a multi-fiber optic ferrule inserted therein in accordance to another embodiment of the present invention.
Figure 10B:
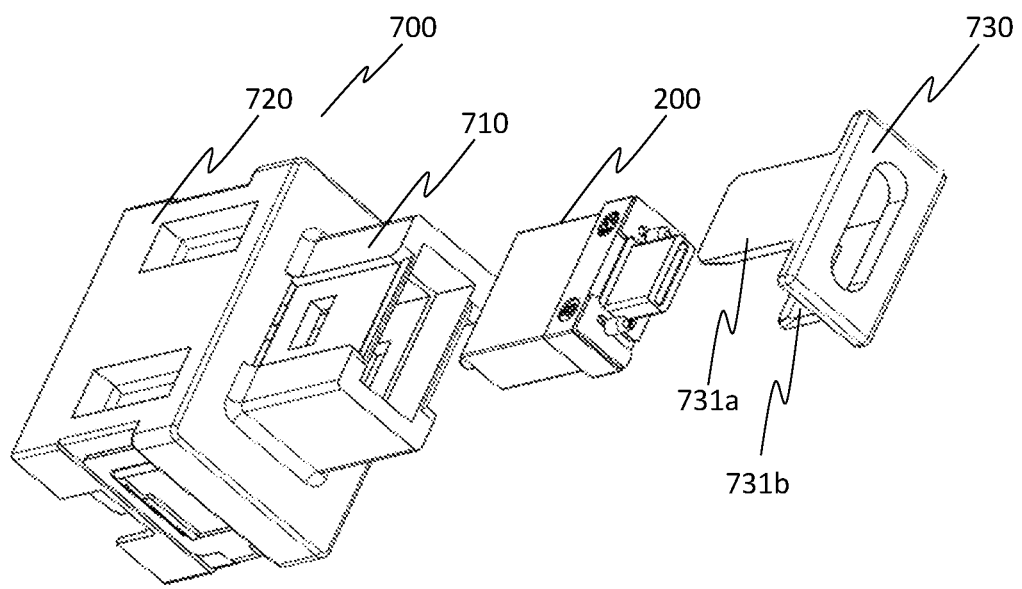
FIG. 10b depicts the fiber optic ferrule adapter and the multi-fiber optic ferrule before assembly.

Referring to FIG. 10a. Shown in the figure is a fiber optic ferrule adapter 700 with a multi-fiber optic ferrule 200 inserted therein in accordance to another embodiment of the present invention. FIG. 10b shows the fiber optic ferrule adapter 700 and the multi-fiber optic ferrule 200 before assembly. The adapter 700 includes a holder 710 having a cavity for holding and securing the multi-fiber optic ferrule therein and a receptacle housing 720 with an opening at the one end further away from the holder 710 that allows the insertion of a fiber optic connector. The holder 710 has a front facing opening at the one end distal from the receptacle housing 720 for receiving the multi-fiber optic ferrule 200 into its cavity. The adapter 700 further includes a retention cap 730 for securing the ferrule 200 within the holder 710. As shown in FIG. 10b, the cap 730 comprises an attachment means for attaching to the adapter 700 body. In one embodiment, the attachment means includes two arms 731a and 731b with a hook or wedge on each of the arms 731a and 731b for interlocking with corresponding indentations or through-holes on the adapter 700 body, such that once attached, the retention cap 730 holds the multi-fiber optic ferrule 200 tightly within the holder 710 and prevents longitudinal movement of the multi-fiber optic ferrule 200 inside the cavity of the holder 710.

Figure 11A:
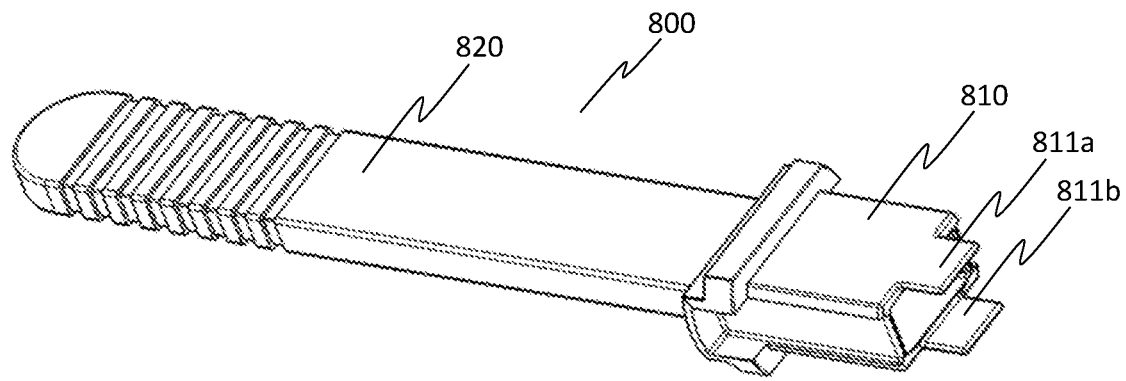
FIG. 11a depicts a ferrule removal tool in accordance to another embodiment of the present invention.
Figure 11B:
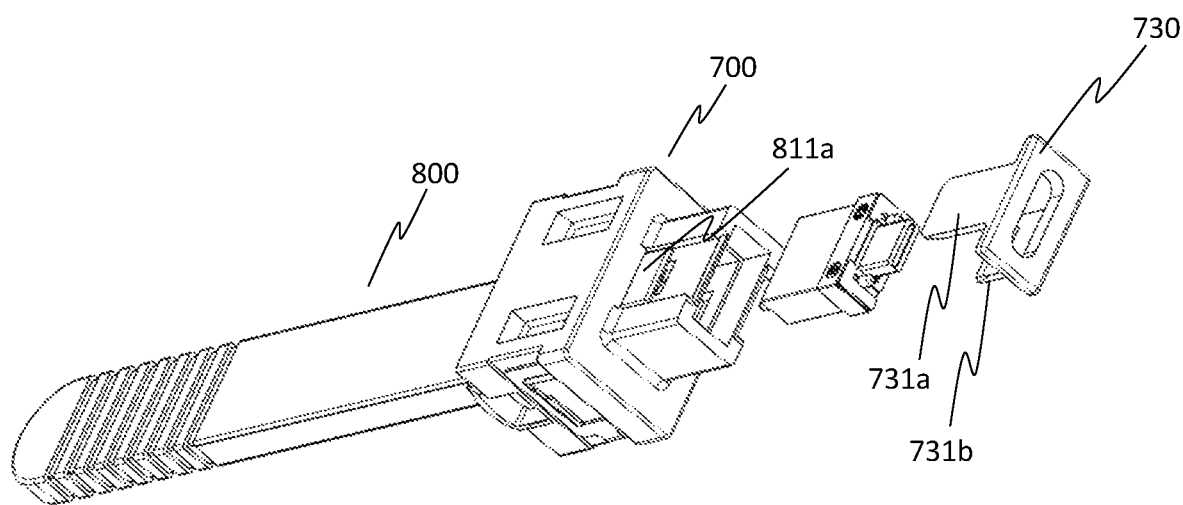
FIG. 11b depicts the ferrule removal tool being used to release the multi-fiber optic from the fiber optic ferrule adapter.

Working in conjunction with the fiber optic ferrule adapter 700 is ferrule removal tool 800 as shown in FIG. 11a. The ferrule removal tool 800 comprises a handle 820 and a frontend 810 with two extensions 811a and 811b at the end distal from the handle 820. As shown in FIG. 11b, the ferrule removal tool 800 operates on the assembled fiber optic ferrule adapter 700 by inserting the frontend 810 into the vacated receptacle housing 720 until the two extensions 811a and 811b come in contact with the retention cap arms 731a and 731b. By pushing on the handle 820, the two extensions 811a and 811b push retention cap arms 731a and 731b the detach the retention cap 730 from the adapter 700 body, thereby releasing the multi-fiber optic ferrule 200 inside the cavity of the holder 710.

An ordinarily skilled person in the art can appreciate that by following the principal of the present invention, a version of the adapter for mating a multi-fiber optic ferrule with another multi-fiber optic ferrule can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic ferrule adapter comprising:
   a holder having a cavity for holding a multi-fiber optic ferrule therein and a receptacle housing with an opening that allows the insertion of a fiber optic connector, the holder having opposing interior side walls spaced apart along a lateral axis, each interior side wall having a inner surface that faces generally along the lateral axis toward the opposing side wall;
   wherein the holder has a top facing opening for receiving the multi-fiber optic ferrule into the cavity;
   two or more protrusions, wherein at least one is fixed on each interior side wall of the holder and protrudes inwardly from the inner surface of the respective interior side wall such that the protrusion has an outer edge along the respective inner surface and an inner end that is spaced apart along the lateral axis toward the opposing interior side wall from the outer edge and the respective inner surface, for latching the multi-fiber optic ferrule in place so as to prevent any up-down movement of the multi-fiber optic ferrule held inside the cavity of the holder; and
   a groove recessed on one or more interior walls of the holder for catching a ridge on the multi-fiber optic ferrule so as to prevent any longitudinal movement of the multi-fiber optic ferrule inside the cavity of the holder.

2. The fiber optic ferrule adapter of claim 1, wherein the protrusions are in wedge shape.

3. The fiber optic ferrule adapter of claim 1, wherein the protrusions are in dome shape.

4. The fiber optic ferrule adapter of claim 1, wherein the protrusions are located at positions distal from the receptacle housing.

5. The fiber optic ferrule adapter of claim 1, further comprising a slope next to an interface between the cavity and the receptacle housing for allowing a sliding in-and-out motion of the multi-fiber optic ferrule at an angle to the top of the opening of the holder during an insertion or extraction of the multi-fiber optic ferrule into or from the cavity.

6. The fiber optic ferrule adapter of claim 1, further comprising one or more though-holes located at the bottom of the holder.

7. A ferrule removal tool for removing the multi-fiber optic ferrule from the fiber optic ferrule adapter of claim 6, the ferrule removal tool comprising one or more protrusion for inserting through the through-holes located at the bottom of the holder of the fiber optic ferrule adapter for exerting a pushing force on to the multi-fiber optic ferrule held within the cavity of the holder to release the multi-fiber optic ferrule from the holder.

8. An outer housing comprising a top shell and a bottom shell for sandwiching and holding the fiber optic ferrule adapter of claim 1 there in between.

9. The fiber optic ferrule adapter of claim 1, further comprising a mount plate secured on the receptacle housing exterior for mounting the fiber optic ferrule adapter in a connector panel.

10. A fiber optic ferrule adapter comprising:
    a holder having a cavity for holding a multi-fiber optic ferrule therein and a receptacle housing with an opening that allows the insertion of a fiber optic connector;
    wherein the holder has a front facing opening located at one end of the holder distal from the receptacle housing for receiving the multi-fiber optic ferrule into the cavity; and
    a retention cap for covering the holder front facing opening, the retention cap comprises an attachment means for attaching to the fiber optic ferrule adapter; and a groove recessed on one or more interior walls of the holder for catching a ridge on the multi-fiber optic ferrule so as to prevent any longitudinal movement of the multi-fiber optic ferrule inside the cavity of the holder;
    wherein the groove is partially defined by a shoulder that faces the front facing opening, the shoulder being configured to engage a proximal facing ridge of the multi-fiber optical ferrule to limit longitudinal movement of the multi-fiber optic ferrule in a proximal longitudinal direction.

11. The fiber optic ferrule adapter of claim 10, wherein the retention cap attachment means comprises:
    one or two arms having a hook or wedge on each of the arms; and
    one or two indentations or through-holes on the fiber optic ferrule adapter body corresponding to the hooks or wedges on the arms, arranged such that when attached, the hooks or wedges on the arms interlock with the indentations or through-holes.

12. A ferrule removal tool for removing the multi-fiber optic ferrule from the fiber optic ferrule adapter of claim 10, the ferrule removal tool comprising:
    a handle;
    a frontend with one end connected to the handle;
    one or more extensions located at one end of the frontend distal from the handle;
    wherein the frontend is configured for inserting into the receptacle housing to allow at least one of the extensions to push and detach the retention cap from the holder front facing opening.

13. An outer housing comprising a top shell and a bottom shell for sandwiching and holding the fiber optic ferrule adapter of claim 10 there in between.

14. The fiber optic ferrule adapter of claim 10, further comprising a mount plate secured on the receptacle housing exterior for mounting the fiber optic ferrule adapter in a connector panel.

* * * * *